(12) United States Patent
Walkauskas

(10) Patent No.: US 10,169,381 B2
(45) Date of Patent: Jan. 1, 2019

(54) DATABASE RECOVERY BY CONTAINER

(75) Inventor: Stephen Gregory Walkauskas, Boston, MA (US)

(73) Assignee: ENTIT SOFTWARE LLC, Sunnyvale, CA (US)

(*) Notice: Subject to any disclaimer, the term of this patent is extended or adjusted under 35 U.S.C. 154(b) by 1658 days.

(21) Appl. No.: 13/459,722

(22) Filed: Apr. 30, 2012

(65) Prior Publication Data

US 2012/0290540 A1    Nov. 15, 2012

Related U.S. Application Data

(60) Provisional application No. 61/485,792, filed on May 13, 2011.

(51) Int. Cl.
*G06F 17/30* (2006.01)
*G06F 13/00* (2006.01)

(52) U.S. Cl.
CPC .. *G06F 17/30303* (2013.01); *G06F 17/30283* (2013.01)

(58) Field of Classification Search
CPC ............... G06F 11/1662; G06F 3/067; G06F 17/30575; G06F 17/30153; G06F 17/30212; G06F 17/30079; G06F 11/1451; G06F 17/30578; G06F 11/1458; G06F 11/1448; G06F 11/1469; G06F 11/1466; G06F 17/30067; G06F 17/30536; G06F 17/3071; G06F 17/30893; G06F 17/30289; G06F 17/3056
USPC ........ 707/683, 767, E17.005, 999.01, 999.1, 707/999.202, 999.204, 821, 822, 640, 707/674, E17.01, E17.117, 999.203, 634, 707/695, 793, 803, 999.101, 999.102; 345/555, 539; 382/244–245; 714/6.3, 714/13; 711/162; 709/201
See application file for complete search history.

(56) References Cited

U.S. PATENT DOCUMENTS

| 5,524,239 | A | 6/1996 | Fortier |
| 6,226,651 | B1 | 5/2001 | Masuda et al. |
| 7,109,997 | B1 * | 9/2006 | Callahan .................. G09G 5/24 345/537 |
| 7,302,440 | B2 * | 11/2007 | Britton .............. G06F 17/30536 |
| 7,702,660 | B2 * | 4/2010 | Chan .................... G06F 11/1471 707/999.202 |
| 8,793,531 | B2 * | 7/2014 | George ............. G06F 17/30519 714/11 |
| 2003/0220944 | A1 * | 11/2003 | Lyman Schottland ...................... G06F 8/658 |
| 2004/0107198 | A1 * | 6/2004 | Ronstrom ........... G06F 11/1662 |
| 2007/0180313 | A1 * | 8/2007 | Stokes .............. G06F 17/30067 714/13 |
| 2008/0040348 | A1 | 2/2008 | Lawande et al. |
| 2009/0100236 | A1 * | 4/2009 | Puig .................... G06F 11/1456 711/162 |

(Continued)

*Primary Examiner* — Syling Yen
*Assistant Examiner* — Cecile Vo

(57) ABSTRACT

A method includes identifying a buddy database projection that corresponds to a recovering database projection that is to be recovered to a recovering node of a database system. A source container containing data of the buddy database projection is identified on a source node of the database system, the source container being characterized by a range of epochs that includes an epoch for which data is to be recovered to the recovering node. Data is copied from the identified source container to the recovering node.

20 Claims, 4 Drawing Sheets

(56) References Cited

U.S. PATENT DOCUMENTS

2011/0213766 A1   9/2011   Hong et al.

* cited by examiner

DATABASE RECOVERY BY CONTAINER

CROSS REFERENCE TO RELATED APPLICATIONS

The present invention claims the priority benefit of U.S. provisional patent application No. 61/485,792 filed on May 13, 2011, which is incorporated in its entirety herein by reference.

BACKGROUND

A modern database system may have data stored at multiple nodes. For example, a node may represent a machine (data storage device, computer) in a cluster of intercommunicating machines.

A node may be subject to failure. Node failure may cause data stored at the failed node to be lost or unavailable. In order to enable continued functioning of the database after failure of a node, data at one node may be replicated on one or more additional nodes. If, at a later time, the failed node again becomes operational or accessible, data that was stored on that node may be reconstructed on the basis of the replicated data.

DETAILED DESCRIPTION

Figure 1:
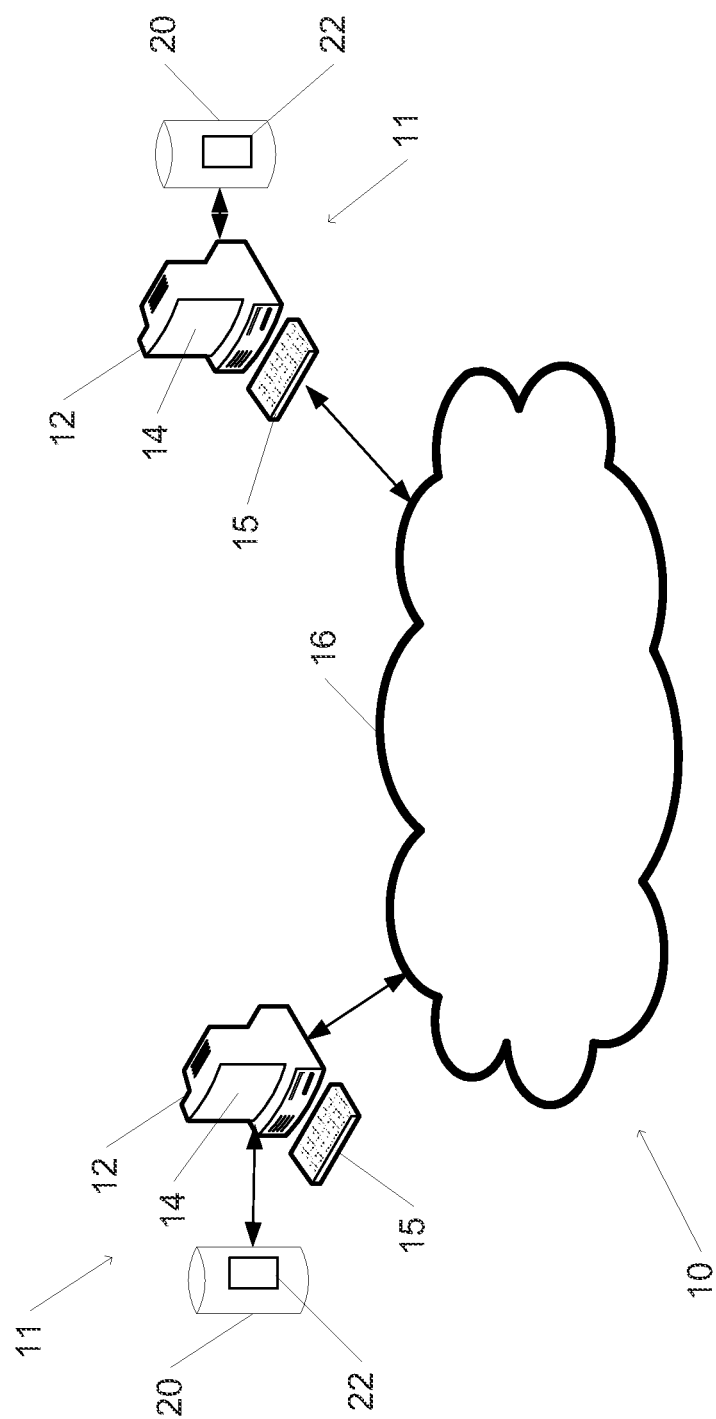
FIG. 1 is a schematic illustration of a database system for application of an example of database recovery by container.

In accordance with an example of database recovery by container, a database table includes a plurality of tuples (referred to also as rows or records). Tuples of the database table may be representable in a form that is herein referred to as a database projection. A database projection may be segmented with one instance of its data stored across multiple nodes (e.g. data storage devices or computers) of a database system or cluster, or a database projection may be unsegmented with a full copy of its data stored on each node or a subset of nodes of a database system or cluster. A database projection may define a particular view of the database table, defined by, for example, a selected subset of table columns (or fields), a sorting order of the tuples, an encoding or compression of the data, or a segmentation of the data (for storage on multiple nodes). A database projection may include one or more indexes that enable efficient retrieval of data, e.g. in response to a query. Each tuple and delete marker may be characterized by an epoch that represents a coarse time stamp showing when that tuple was last modified (e.g. added, deleted, or its data content was modified—modification of data content may be treated as deletion of the original tuple and addition of a modified tuple).

The data of the database projection may be segmented into segments. Segments may be stored in storage units that are herein referred to as containers. Each container may be stored on a single node of the database system. Multiple containers of a single database projection may be stored on a single node. For example, a container may include one or more data files (e.g. a file, or multiple files, containing contents of a column of the database projection) and metadata. Data that is subsequently added to the database may be stored in a separate container.

In order to effectively utilize storage space and reduce runtime costs, such as the amount of data read from disk, data may be stored in a container in a compressed form. A container may include a database index or another appropriate structure to enable efficient processing of a query to the database. In some cases, accessing the index may enable performing a query on tuples that are included in the container without requiring decompression of data included in the container.

Two or more copies of a database projection may be stored. Each of the multiple copies of a database projection is herein referred to as a buddy database projection of the other copies of the database projection. Each buddy database projection may be segmented into segments that are stored in the form of containers. Containers of the database projection may be stored such that corresponding containers of the buddy database projections are stored on different nodes. For example, a function (e.g. a hash function or other segmentation function or algorithm) that determines distribution of containers among nodes may include a different offset value for each buddy database projection. (For example, in database projection 1, container 1 is assigned to node 1 and container 2 is assigned to node 2. For database projection 2, which is a buddy projection to database projection 1, container 1 is assigned to node 2 and container 2 is assigned to node 1.) In this manner, if a single node fails, another copy of the container may still be available on another node.

Typically, a database is continually modified or updated. For example, tuples may be added or deleted, or content of a data field of a tuple may be modified. The modifications may be treated in such a manner that data that is stored in a container is not modified. For example, when a tuple is added, the added tuple may be added to a new container. When a tuple in a container is deleted, the data in the container may remain intact but the tuple is marked as deleted in an index to that tuple, and the delete is also characterized by an epoch which may differ from the epoch associated with the corresponding tuple. A modification of content of a tuple may be treated as deletion (and marking) of the original tuple, followed by addition of the modified tuple to a new container. It may be advantageous to periodically merge containers, e.g. to improve data locality (keep related data closer together on a disk) and to reduce resources needed to read from the containers. Data contained in merged containers may span multiple epochs. When all copies of a database projection are available, corresponding modifications are made to all of the corresponding buddy database projections.

Occasionally, a node may fail or be otherwise inaccessible, unavailable, or down. For example, a network connection to a node may be unavailable, or a computer with which the node is associated may be turned off. In such a case, if modifications to the database are made, data on the failed node may not be updated. Thus, the corresponding database projection may be out of date. However, a corresponding buddy database projection, with containers stored on other nodes, may continue to be updated.

Each container may be characterized by a range of epochs that indicate when the contained tuples were last modified. An epoch may be incremented whenever the database is modified (e.g. a tuple added, deleted, or modified), after a predetermined number of modifications, or in accordance with a predetermined time period. An epoch range that characterizes a container indicates that the container was accessible during the epochs of the range.

A node that had failed may become available again at a later time. For example, a connection of that node may be restored, or a computer that is associated with that node may be powered on again. As another example, a new node may be connected to the system in place of a failed node. A database system may be configured to detect the accessibility of a node to the system. When restoration of a node is detected, a recovery process may be performed to restore data to the node that had become available (herein referred to as a recovering node). For example, data content of a container that is stored on that recovering node may have been deleted or corrupted when that node had failed. Thus, the entire container may require replacement in order to restore the data. In other cases, containers may have been inaccessible during a period that included modifications to tuples of the database. In this case, when the container again becomes available on the recovering node, contents of the container may require updating. For example, an index to deleted tuples may require marking as deleted, and one or more containers of added tuples may need to be added. The updating of the recovering container may reflect any modifications that were made during the epochs when that container was not available.

In some cases, recovery of a container may be performed efficiently by directly copying a corresponding source container of the buddy database projection to a target container on the recovering node. Direct copying herein refers to byte-for-byte copying of data from the source container of the buddy database projection to the target container on the recovering node. During direct copying, data in the container is not decompressed, decoded, or otherwise processed. For example, direct copying may be indicated if a sufficiently large amount of data of the container is to be copied. If an index or other query-related structure is included in the container, direct copying may eliminate or reduce any rebuilding of an index to the recovering database projection after copying.

In other cases, where only a small amount of data needs to be updated, it may be preferable to decompress the source container, copy the data to a decompressed target container, and recompress the containers. For example, a mode of copying data may be indicated by application of a decision algorithm. Such a decision algorithm may include comparing an amount of data to be copied (e.g. an absolute data size, e.g. expressed in bytes, or a fraction of the data in the source or target container) with a threshold value.

In some cases, a source container of the buddy database projection may contain data that was modified during epochs during which the recovering node had been accessible (e.g. prior to failure), and for which the recovering database projection already contains updated data. In other cases, the source container may contain some but not all data which is to be recovered from a container of a buddy database projection. Although only part of the data in the source container is required, it may be deemed more efficient (e.g. due to the quantity of data involved) to directly copy a source container to the recovering node rather than only that part of the data (tuples) that is required. In such a case, the recovered target container of the recovering database projection may include duplicate data. However, such duplicated data may be ignored when accessing the database, e.g. via a query. In such a case, a filter may be added to a query to the recovered target container so as to ignore duplicate data. For example, the filter may limit results on the target container to those tuples whose epoch is later than the time when the recovering node had failed.

When a node becomes unavailable, data in a buddy database projection may be reorganized so as to optimize recovery of that node when that node becomes available again. For example, if the node failed during a particular epoch (e.g. epoch 10), corresponding containers of buddy database projections stored on other nodes may be reorganized into two strata. In such a reorganization, one stratum may include those characterized by an epoch prior to the failure (e.g. epochs less than epoch 10), and the stratum may include those containers characterized by epochs after the failure (e.g. greater than or equal to epoch 10).

A recovering database projection may have multiple buddy database projections. In such a case, the recovering database projection may recover data from the buddy database projection whose data is organized most optimally. For example, data may be recovered from a node having containers that were organized into separate strata, as described above.

Examples of database recovery by container as described herein may be advantageous. For example, database recovery by container where tuples are characterized by an epoch may enable reduction of the amount of time that a database table is locked against modification. In addition, there is no need to maintain a log of all database modifications and to replay all logged events as would be required by some database recovery methods as applied by some database systems. During such recovery, the database would require locking against any further modifications, and would not be available or accessible. Also copying storage, particularly compressed storage and especially when it contains all structures needed to process queries efficiently (e.g. indexes), may perform better than alternative approaches, such as replaying transaction logs.

In accordance with examples of database recovery by container, the database may continue to be modified concurrently with recovering a database projection. For example, deletions made concurrent with recovery may be logged, and replayed (for a relatively short time) before recovery is complete. At that point, the deleted tuples may be marked as deleted. Added tuples may be saved in a new container, which may be incorporated in the recovering projection before recovery is complete. Changes to content of a tuple may be treated as a combination of deleting the original tuple and adding a modified tuple A database table lock that permits reading from the table but blocks modification of the table need only be applied for a relatively short time, e.g. during a final step of recovering a database projection. Application of the database table lock, by preventing modification of the table for a short time, may ensure consistency between the recovering database projection and the corresponding buddy database projection.

In accordance with an example of a method for recovery of a database projection, a buddy database projection of a database may be identified, the buddy database projection corresponding to a recovering database projection that is being recovered on a recovering node. A source container of the buddy database projection may be identified that corresponds to data of the recovering database projection that is to be restored to the recovering node, and that is characterized by a range of epochs that includes an epoch for which data is to be recovered to the recovering node. Data from the identified source container may then be copied to the recovering node.

Figure 2:
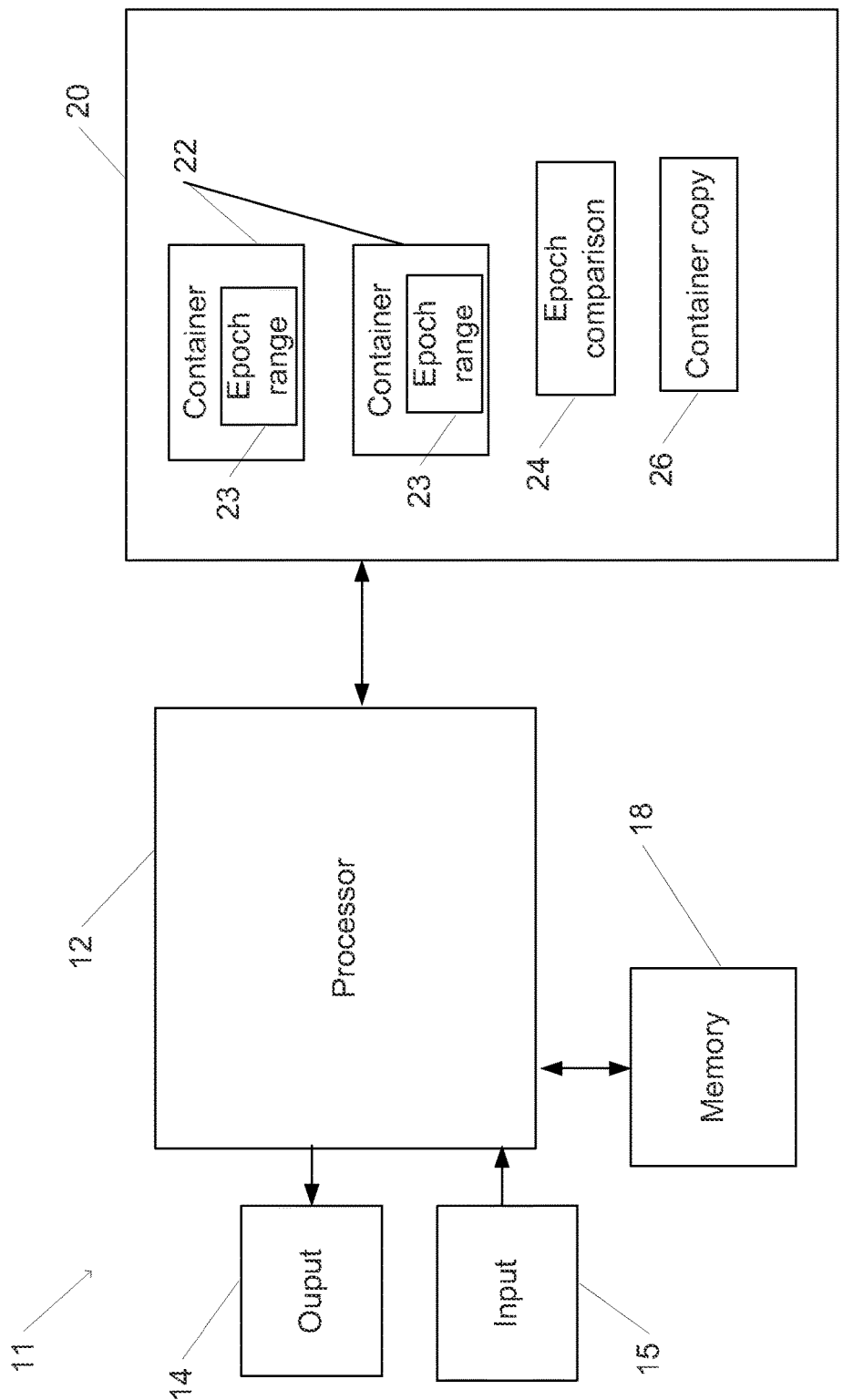
FIG. 2 is a schematic illustration of a node of the database system shown in FIG. 1.

A database system may be configured to perform an example of database recovery by container. FIG. 1 is a schematic illustration of a database system for application of an example of database recovery by container. FIG. 2 is a schematic illustration of a node of the database system shown in FIG. 1.

Database system 10 includes a plurality of nodes 11 (two are shown) interconnected or intercommunicating via network 16. One or more of nodes 11 may include a processor 12. For example, processor 12 may include one or more processing units, e.g. one or more computers. Processor 12 may be configured to operate in accordance with programmed instructions stored in memory 18. Processor 12 may be capable of executing an application for recovery by container. As another example, some or all of the components of processor 12 may be associated with a server or other computer or processor of database system 10 that is not associated with a node 11.

Processor 12 may communicate with output device 14. For example, output device 14 may include a computer monitor or screen. Processor 12 may communicate with a screen of output device 14 to display a result of a query to a database that is managed by or stored on components of database system 10. In another example, output device 14 may include a printer, display panel, speaker, or another device capable of producing visible, audible, or tactile output.

Processor 12 may communicate with input device 15. For example, input device 15 may include one or more of a keyboard, keypad, or pointing device for enabling a user to input data or instructions for operation of processor 12.

Processor 12 may communicate with memory 18. Memory 18 may include one or more volatile or nonvolatile memory devices. Memory 18 may be utilized to store, for example, programmed instructions for operation of processor 12, data or parameters for use by processor 12 during operation, or results of operation of processor 12.

Processor 12 may communicate with data storage device 20. Data storage device 20 may include one or more fixed or removable nonvolatile data storage devices. Data storage device 20 may be accessed to store or retrieve one or more containers 22 of a database projection. A container 22 may include one or more components of a database, such as one or more tuples or fields, in compressed form. A container 22 may be characterized by one or more epoch ranges 23. For example, each tuple that is included in a container 22 may be characterized by an epoch that indicates when that tuple was modified (e.g. added, deleted, or content modified). A container may be characterized by a range of epochs that indicates the earliest and latest epochs that characterize tuples that are included in that container 22.

Data storage device 20 may include a computer readable medium for storing program instructions for operation of processor 12. In this example, the programmed instructions may take the form of epoch comparison module 24 for comparing an epoch of a tuple or container with an epoch that requires replacing. The programmed instructions may include container copy module 26 for controlling copying of a container, or contents of a container, from one node to another. It is noted that storage device 20 may be remote from processor 12. In such cases, storage device 20 may be a storage device of a remote server storing comparison module 24 or copy module 26 in the form of an installation package or packages that can be downloaded and installed for execution by processor 12. Data storage device 20 may store data or parameters for use by processor 12 during operation, or results of operation of processor 12.

Figure 3:
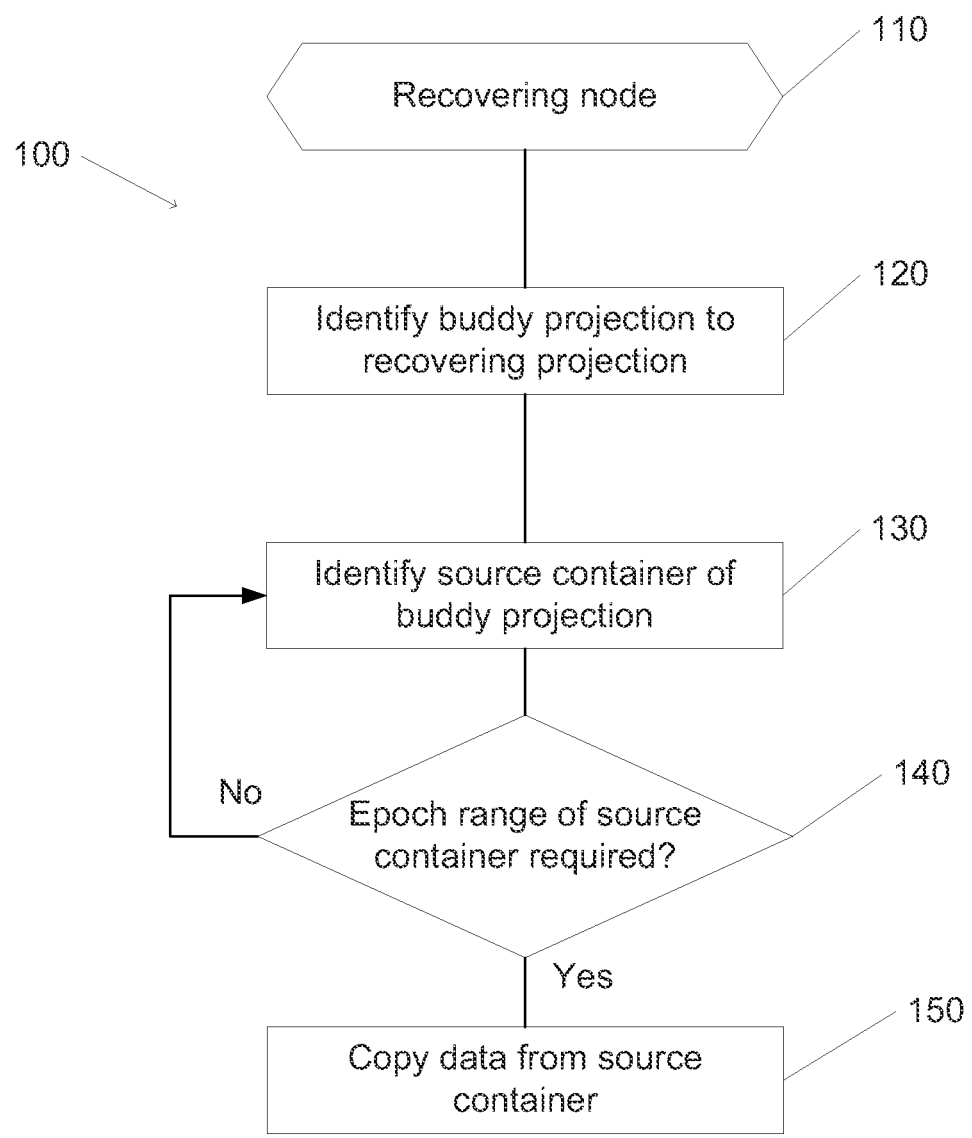
FIG. 3 is a flowchart depicting a method for database recovery by container.

FIG. 3 is a flowchart depicting a method for database recovery by container. In the Example of FIG. 3, database recovery method 100 may be executed by a processor of a system for database recovery by container.

It should be understood with respect to the flowchart that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other examples of the illustrated method. Similarly, it should be understood that, unless indicated otherwise, the illustrated order of execution of the operations represented by blocks of the flowchart has been selected for convenience and clarity only. Operations of the illustrated method may be executed in an alternative order, or concurrently, with equivalent results. Such reordering of operations of the illustrated method should be understood as representing other examples of the illustrated method.

Figure 4:
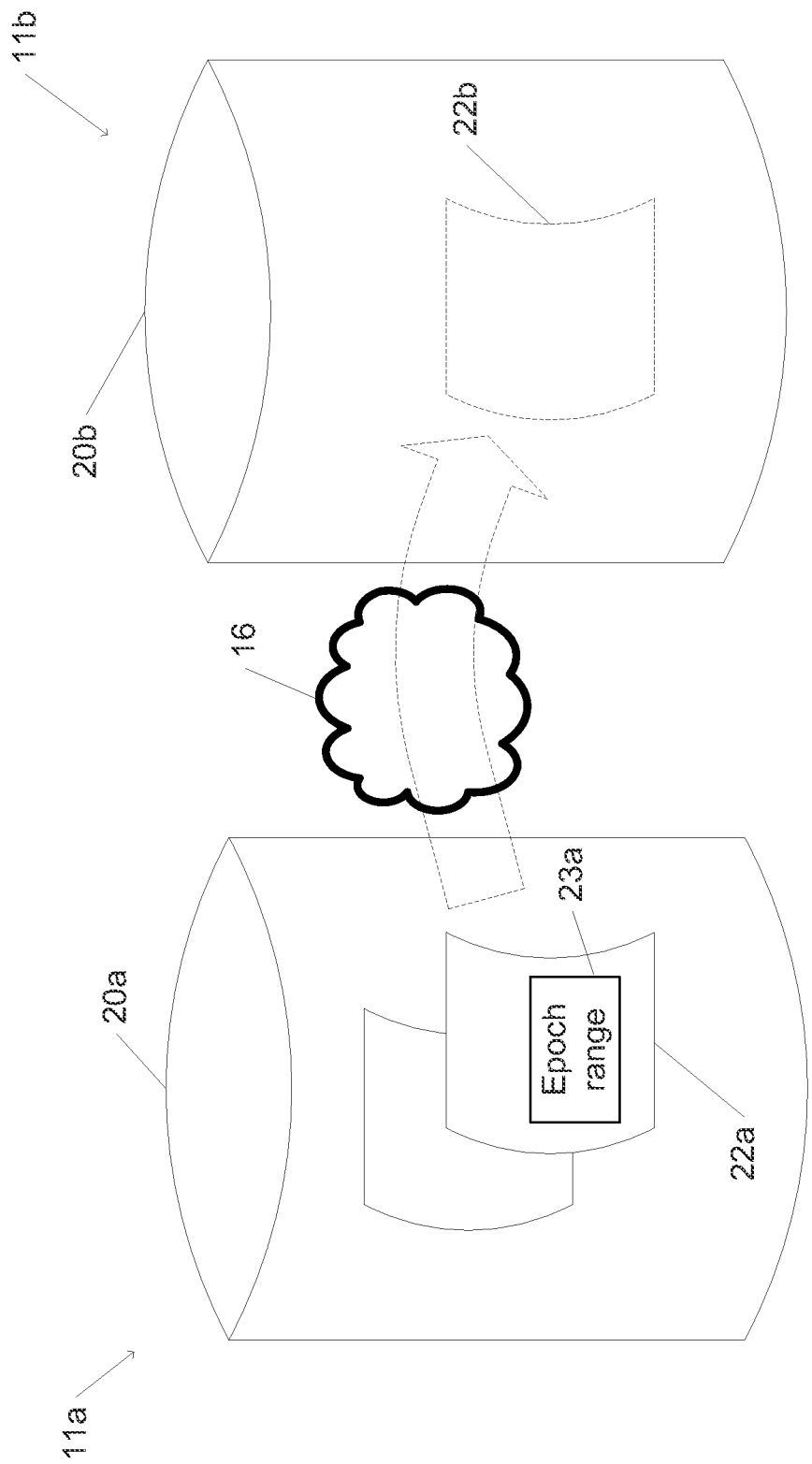
FIG. 4 schematically illustrates application of operations of the database recovery method illustrated in FIG. 3.

FIG. 4 schematically illustrates application of operations of the database recovery method illustrated in FIG. 3. Database recovery method 100 may be executed by one or more processors of a database system. For example, database recovery method 100 may be executed by a processor that is associated with a recovering node 11b of the database system, a processor that is associated with another node 11a of the database system, or a server or other central processor that is associated with network 16 or with all or some of the nodes of the database system.

Database recovery method 100 may be executed when a node is recovering (block 110). Recovering node 11b may represent a node that had become temporarily inaccessible to the remainder of a database system and has become accessible again. For example, a device that includes, is included in, or is associated with recovering node 11b may have temporarily ceased to operate, or may have been temporarily disconnected from network 16. For example, a device such as data storage device 20b may have been temporarily inaccessible. A device that had ceased to operate may have been replaced with an operational device that was made accessible to the database system.

Data (e.g. in data containers) associated with one or more database projections of a database may have been stored on recovering node 11b prior to its becoming inaccessible. Thus, when recovering node 11b becomes accessible again, any updates to data in said containers may be restored to the recovering node 11b.

A processor that detects the accessibility or availability of recovering node 11b to the database system via network 16 may be configured to automatically initiate execution of database recovery method 100.

An epoch or range of epochs may be associated with recovering node 11b. For example, a range of epochs may represent a period of time when recovering node 11b had not been accessible. (The range may begin with the first epoch of the database system in the case that recovering node 11b had not been previously accessible to the database system.) Thus, in order to restore operation of recovering node 11b, data that was updated during that range of epochs may be restored by copying from corresponding data (from a buddy database projection) that is stored on other nodes. For example, a processor that is executing database recovery method 100 may access a directory or other meta-data that indicates when one or more nodes of the database system were accessible by the database system.

Data to be restored on recovering node 11b may include data that is associated with one or more recovering database projections of one or more database tables. For example, a directory that is accessible by a processor that is executing database recovery method 100 may indicate which data is expected to be stored on recovering node 11b. The indicated data may include one or more containers that are associated with one or more recovering database projections.

A database system that includes a recovering database projection, a container of which is to be restored to recovering node 11b, may include a buddy database projection to the recovering database projection. For example, a directory to sets of buddy database projections may be accessible by a processor that is executing database recovery method 100. Thus, a buddy database projection to a recovering database projection may be identified (block 120). (One or more other containers that are to be restored to recovering node 11b may be associated with the buddy database projection, or to an unrelated database projection.)

A source container 22a that is associated with the identified buddy database projection may be identified on a source node 11a (block 130). Source node 11a may be connected via network 16 to recovering node 11b. Source container 22a may be stored on a source data storage device 20a that is associated with source node 11a. For example, a processor that is executing database recovery method 100 may access a directory of containers that are associated with the buddy database projection, or may communicate with other nodes of the database system to identify a buddy database projection.

A source container 22a may be characterized by an epoch range 23a. Epoch range 23a may indicate the range of epochs of data (e.g. of tuples) that is contained in source container 22a. For example, one or more data fields that indicate epoch range 23a may be stored in a header or elsewhere in source container 22a, or on a log, directory, table or other meta-data that includes data related to containers on source node 11a, or on all or some of the nodes of the database system.

Epoch range 23a of source container 22a may be compared with a range of epochs for which data is to be restored to recovering node 11b (block 140). For example, part or all of epoch range 23a may at least partially overlap with a range of epochs that corresponds to a period when recovering node 11b was not accessible by the database system.

If epoch range 23a of source container 22a does not include any epochs for which data is to be restored to recovering node 11b, no data is copied from source container 22a to recovering node 11b. Another source container that is associated with the buddy database projection may be identified (returning to block 130).

If epoch range 23a of source container 22a includes at least some epochs for which data is to be restored to recovering node 11b, data from source container 22a may be copied to recovering node 11b (block 150). For example, source container 22a may be directly copied from source storage device 20a to recovering storage device 20b of recovering node 11b so as to create recovered container 22b. Direct copying includes creating a byte-for-byte copy of source container 22a on recovering node 11b. Thus, no decompression or decoding of data in source container 22a may be required. Direct copying of source container 22a to recovered container 22b on recovering node 11b may also copy any indexes or other data to expedite processing of queries to recovered container 22b.

During direct copying of source container 22a to recovered container 22b, data in the recovering or source database projection may continue to be concurrently updated, Concurrently updated data may relate to contents of source container 22a. However, such concurrent updates may be included in another container or in a temporary file or structure on source node 11a or elsewhere. For example, an added tuple may be included in a separate container. A deleted tuple may be recorded in a log. Thus, when the direct copying of source container 22a to recovered container 22b is complete, the concurrently updated data may be copied. For example, a container that contains any added tuples may be copied after recovery. A logged delete may be replayed, if the recovering projection's container is a copy of the buddy projection's container the associated delete indexes can be copied from the buddy projection to the recovering projection, otherwise the tuple corresponding to the delete can be reconstructed by reading all of the column values from the buddy projection's container and matched against a corresponding tuple in the recovering projection's container. Thus a tuple deleted on the buddy projection is marked deleted on the recovering projection, e.g. in an index that is included in recovered container 22b.

Epoch range 23a of source container 22a may only partially overlap the epochs for which data is to be restored to recovering node 11b. Thus, part of the epochs included in epoch range may be superfluous. For example, data for the superfluous epochs may be already present in the recovering database projection, or may be designated for restoration from a container other than source container 22a. In this case, one possibility is to directly copy the entire source container 22a to recovered container 22b. However, the superfluous part of the copied data may be duplicated in the recovering database projection. The duplication may be ignored, however, when querying the database. For example, a database index that is stored in recovered container 22b may be modified to ignore content of recovered container 22b that corresponds to the superfluous epochs. As another example, a filter may be added to any queries to the recovering database projection in which any data on the recovered container with the range of superfluous epochs is ignored. Another possibility, e.g. when the amount of data is very small (e.g. as defined by a threshold value) in comparison with all of the data in source container 22a may include decompressing or decoding source container 22a, and to only transfer the required data to recovered container 22b.

In accordance with an example of a method for database recovery by container, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for database recovery by container. The computer-readable medium may be a non-transitory computer-readable media including all forms and types of computer-readable media except for a transitory, propagating signal.

I claim:
1. A method comprising:
   identifying a buddy database projection that is a copy of a recovering database projection of a database, wherein the recovering database projection is stored on a recovering node of a database system and the buddy database projection is stored on a source node of the database system, the buddy database projection and the recovering database projection each providing a first view of a first database table;
   identifying, based on the identified buddy database projection, a source container on the source node of the database system, the source container containing data of the identified buddy database projection; and in response to a determination that a range of epochs of the identified source container includes an epoch for which data is to be recovered to the recovering database projection from the buddy database projection, direct copying the identified source container on the source node to the recovering node.

2. The method of claim 1, wherein the data contained by the source container is compressed.

3. The method of claim 2, wherein the direct copying of the source container to the recovering node is performed without decompressing the compressed data of the source container.

4. The method of claim 1, wherein the range of epochs includes a superfluous epoch for which data need not be recovered to the recovering node.

5. The method of claim 4, further comprising automatically applying a filter to a query to the recovering database projection so as to prevent a returned result to the query from including data that is associated with the superfluous epoch.

6. The method of claim 1, wherein the data in the container comprises an index of the first database table.

7. The method of claim 1, wherein the database is modifiable concurrently with copying the data.

8. A non-transitory computer readable storage medium having stored thereon instructions that when executed by a processor will cause the processor to perform the method of:

identifying a recovering node of a database system;

identifying a recovering database projection of a database, wherein the recovering database projection is stored on the recovering node;

identifying a buddy database projection that is a copy of the recovering database projection, wherein the buddy database projection is stored on a source node of the database system, the buddy database projection and the recovering database projection each providing a first view of a first database table;

identifying, based on the identified buddy database projection, a source container on the source node of the database system, the source node being different from the recovering node, the source container containing data of the identified buddy database projection;

in response to a determination that a range of epochs of the identified source container includes an epoch for which data is to be recovered to the recovering database projection from the buddy database projection, direct copying the identified source container to the recovering node.

9. The computer readable storage medium of claim 8, wherein the data contained by the source container is compressed.

10. The computer readable storage medium of claim 9, wherein the direct copying of the source container to the recovering node is performed without decompressing the compressed data.

11. The computer readable storage medium of claim 8, wherein the range of epochs includes a superfluous epoch for which data need not be recovered to the recovering node.

12. The computer readable storage medium of claim 11, further comprising automatically applying a filter to a query to the recovering database projection so as to prevent a returned result to the query from including data that is associated with the superfluous epoch.

13. The computer readable storage medium of claim 8, wherein the data in the container comprises an index of the first database table.

14. The computer readable storage medium of claim 8, wherein the database is modifiable concurrently with copying the data.

15. A system comprising:

a processing unit in communication with a computer readable medium, wherein the computer readable medium contains a set of instructions wherein the processing unit is designed to carry out the set of instructions to:

identify a recovering node of a database system;

identify a buddy database projection that is a copy of a recovering database projection of a database, wherein the recovering database projection is stored on the recovering node, wherein the buddy database projection is stored on a source node of the database system, the buddy database projection and the recovering database projection each providing a first view of a first database table;

identify, based on the identified buddy database projection, a source container on the source node of the database system, the source container containing data of the buddy database projection; and in response to a determination that a range of epochs of the identified source container includes an epoch for which data is to be recovered to the recovering database projection from the buddy database projection, direct copy the identified source container on the source node to the recovering node.

16. The system of claim 15, wherein the source node and the recovering node are connected via a network.

17. The system of claim 15, wherein the data contained by the source container is compressed.

18. The system of claim 15, wherein the system is configured to direct copy the source container byte-for-byte to the recovering node.

19. The system of claim 15, wherein the system is configured to modify the database concurrently with copying the data from the source container to the recovering node.

20. The system of claim 17, wherein the direct copy of the source container to the recovering node is performed without decompressing the compressed data.

* * * * *